United States Patent
Kao et al.

(10) Patent No.: US 6,371,267 B1
(45) Date of Patent: Apr. 16, 2002

(54) LIQUID COOLED MAGNETORHEOLOGICAL FLUID CLUTCH FOR AUTOMOTIVE TRANSMISSIONS

(75) Inventors: Chi-Kuan Kao; Patrick Benedict Usoro, both of Troy; Andrew Leslie Bartos, Clarkston; Anthony L. Smith, Troy, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/706,392

(22) Filed: Nov. 6, 2000

(51) Int. Cl.$^7$ ............................ F16D 37/02; F16D 13/72
(52) U.S. Cl. .................. 192/21.5; 192/113.31
(58) Field of Search .................. 192/21.5, 113.3, 192/113.31; 188/267, 267.1, 267.2, 264 CC

(56) References Cited

U.S. PATENT DOCUMENTS

| | | | | |
|---|---|---|---|---|
| 5,178,582 A | * | 1/1993 | Maji et al. .............. | 188/264 A |
| 5,667,715 A | | 9/1997 | Foister .................... | 252/62.52 |
| 5,803,219 A | * | 9/1998 | Ogawa .................. | 192/113.31 |
| 5,823,309 A | | 10/1998 | Gopalswamy et al. ..... | 192/21.5 |
| 5,890,983 A | * | 4/1999 | Kawahara et al. ....... | 188/264 D |
| 6,032,772 A | * | 3/2000 | Moser et al. ............. | 192/21.5 |
| 6,318,531 B1 | * | 11/2001 | Usoro et al. ............... | 192/21.5 |

FOREIGN PATENT DOCUMENTS

JP 52-153057 * 12/1977

* cited by examiner

Primary Examiner—Rodney H. Bonck
(74) Attorney, Agent, or Firm—Jeffrey A. Sedlar; George A. Grove

(57) ABSTRACT

A magnetorheological fluid clutch has a pair of radially spaced magnetic core members that cooperate with an input rotor to form a pair of working gaps filled with magnetorheological fluid (MRF). An encapsulated electric coil disposed in a radially inner of the two magnetic cores is energized to establish a magnetic field through the cores, the input rotor and the MRF to establish a torque transmitting relation therebetween. The magnetic cores are secured to a channel ring and a housing in both of which a plurality of cooling channels are formed. The channels in the housing are in fluid communication with an input path to a serpentine flow path formed between the radially outer magnetic core and the housing to direct liquid cooling flow thereto. A return path from the serpentine flow path is in communication with the channels in the channel ring to direct liquid cooling flow therefrom. Further cooling passages are formed in the housing, channel ring, and radially inner magnetic core to direct liquid cooling through an annular chamber containing the encapsulated electric coil. The liquid cooling flow from the annular chamber and the channels in the channel ring are commingled and returned to a reservoir.

8 Claims, 4 Drawing Sheets

LIQUID COOLED MAGNETORHEOLOGICAL FLUID CLUTCH FOR AUTOMOTIVE TRANSMISSIONS

TECHNICAL FIELD

This invention relates to fluid clutches and, more particularly, to magnetorheological fluid clutches having liquid cooling.

BACKGROUND OF THE INVENTION

Magnetorheological fluid clutches (MRC) have been proposed for various applications requiring a torque responsive control, such as engine cooling fan clutches. More recently, the magnetorheological fluid clutches have been proposed as transmission clutches replacing conventional torque converters as a starting clutch or launch device. A magnetorheological fluid is a suspension of finely powdered magnetizable solids, such as iron or iron alloy, in a suitable fluid medium such as mineral oil, synthetic oil or silicone. A magnetorheological fluid clutch may consist of this type of fluid suspension carried between clutch plates with an associated device providing a desired magnetic flux level across the clutch plates and the fluid. The clutch plates are typically made of a material with high magnetic permeability such as iron. When the magnetic flux is generated across the clutch plates and through the magnetorheological fluid, the suspended particles respond. The response is embodied as an attraction between the clutch plates and the magnetorheological fluid particles. This characteristic phenomenon combined with the internal magnetic attraction between the fluid particles results in torque transmission between the clutch plates. Many of the magnetorheological clutches that have been disclosed in the prior art have been called magnetic particle clutches because they use a suspension of magnetizable particles in a dry powder base. With the development and use of suspensions of magnetizable particles in a fluid medium, studies were conducted into the rheology and features of these suspensions, and consequently, the terminology of magnetorheological fluids as been coined.

The MRC, when used as a launch device, is required to transmit considerably more power than when used as a fan clutch. The MRC, when used as a launch device, can generate a considerable amount of heat that must be expelled from the clutch assembly. As with fan clutches, the MRC launch device relies heavily on air cooling to dissipate the heat generated within it. This limits the size and power capacity of the MRC unless extraordinary methods of cooling air volumes is undertaken. Such increases in air flow result in larger air cooling chambers and large capacity fans or air pumps to provide the air flow volumes necessary to provide the required cooling. As a result of this cooling requirement, prior art application of the MRC as a vehicle launch device have been limited to low-displacement engine (approximately 1.3 L) powertrains. One prior art patent (U.S. Pat. No. 5,823,309 issued Oct. 20, 1998) has proposed the use of transmission hydraulic fluid as a cooling medium. This patent describes a MRC wherein transmission fluid is circulated through a heat exchanger positioned radially inward of a plurality of clutch discs to transfer heat from the clutch to the hydraulic fluid. The majority of the heat rejection passes from the clutch components through the heat exchanger, but the capacity and, therefore, the effectiveness of this heat exchanger are highly limited.

SUMMARY OF THE INVENTION

It is an object of the present invention to provide an improved magnetorheological fluid clutch (MRC) having integral liquid cooling. In one aspect of the present invention, a MRC has a coolant inlet port and a coolant outlet port surrounding the output shaft for the MRC. In another aspect of the present invention, a front magnetic core and a rear magnetic core are assembled to contain an encapsulated electromagnetic coil and provided with passages for supplying liquid coolant to and from the coil. In yet another aspect of the present invention, a rear magnetic core and a coolant channel ring have a plurality of axial flow paths that direct liquid coolant toward the encapsulated magnetic coil. In still another aspect of the present invention, a plurality of radial flow paths are formed in the housing and coolant channel ring to direct liquid coolant in a serpentine path from the inlet port, over an outer surface of the outer magnetic core, to the outlet port.

In yet still another aspect of the present invention, flow paths for the liquid cooling medium are formed in the clutch housing, the coolant channel ring, and the rear core. In yet still another aspect of the present invention, a flow divider plate is secured radially inward of the rear core and the channel ring to direct coolant liquid from the inlet port toward radial flow paths in the clutch housing. In a further aspect of the present invention, the flow channel ring is secured to the rear core and has formed therein a plurality of flow paths to direct the liquid coolant from axial flow paths, formed between the housing and the outer magnetic core, to the divider plate and the outlet port. In a yet further aspect of the present invention, the divider plate prevents the intermingling of the inlet coolant flow and the outlet coolant flow. In a still further aspect of the present invention, a portion of the liquid inlet flow in the housing channels is directed to flow past the encapsulated coil and return to join the outlet flow from the flow channel ring at the divider plate.

In operation, the magnetorheological clutch assembly provides torque transfer between an input member and an output member through the contained magnetorheological fluid. When an encapsulated coil is supplied with electrical current from an external source that communicates with the magnetorheological clutch through a conventional interface such as slip rings, an electromagnetic field is established. The magnetic field passes through the input and output members and across the magnetorheological fluid in a cavity which is disposed in working gaps between the input and output members. The magnetic field provides the necessary coupling in an energy transfer process between the input member and the output member. By varying the current level to the encapsulated coil, smooth transmission shifting, gradual torque transfer increases, and substantial lock-up between the input and output members is alternately achieved. Transmission fluid is circulated as a coolant through annular spaces surrounding the inner and outer peripheries of the magnetorheological clutch assembly. Accordingly, an efficient and durable magnetorheological clutch is provided. A fan clutch using a magnetorheological clutch having a structure similar to the assembly disclosed herein, without the cooling of the present invention, is disclosed in U.S. Ser. No. 09/598,327 filed Jun. 20, 2000 and assigned, in part, to the assignee of the present invention.

DESCRIPTION OF AN EXEMPLARY EMBODIMENT

Figure 1:
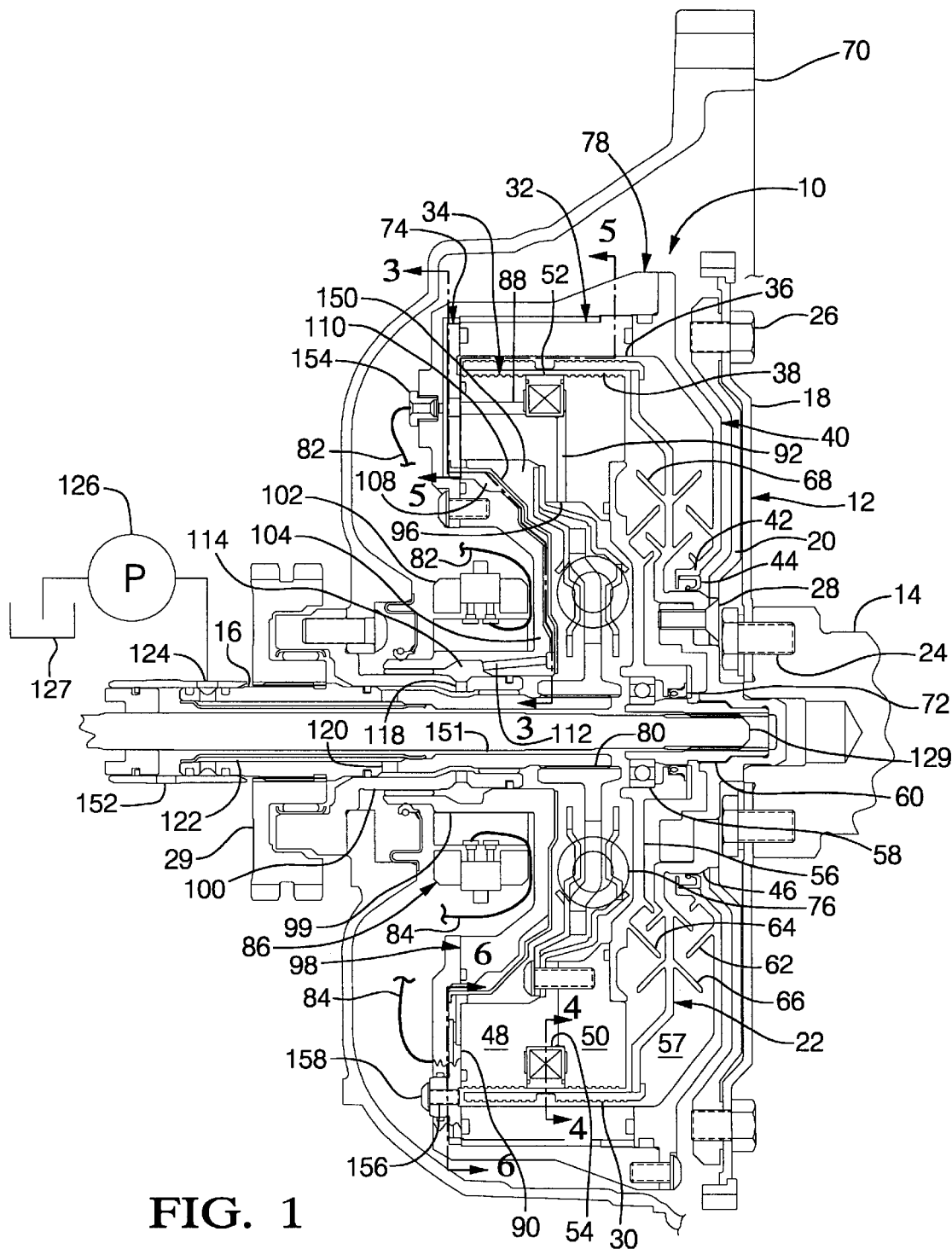
FIG. 1 is an elevational view of a magnetorheological fluid clutch incorporating the present invention.

A magnetorheological clutch (MRC) assembly 10 has an input member 12, connected with an engine 14, and an output shaft 16. The input member 12 includes a flex-plate 18, a drive plate 20 and a labyrinth plate 22. The flex-plate 18 is secured to the engine 14 by fasteners 24. The drive plate 20 is secured between the flex-plate 18 and the labyrinth plate 22 by fasteners 26 and 28, respectively. The output shaft 16 is connected with a drive sprocket 29 that is drivingly connected with a conventional power transmission through a chain drive, not shown.

The labyrinth plate 22 is secured to an input rotor 30 that is rotatably disposed between an outer magnetic core 32 and an inner magnetic core 34. The input rotor 30 is separated from the outer magnetic core 32 and the inner magnetic core 34 by respective annular working gaps 36 and 38. The outer magnetic core 32 has a side plate or cover 40 secured thereto, which cover 40 has an inner annular portion 42 in which a seal 44 is secured and disposed to sealingly engage an annular hub 46 formed on the labyrinth plate 22. The inner magnetic core 34 includes a rear core member 48 and a front core member 50 that are secured together by fasteners, not shown. An annular encapsulated coil 52 is secured in an annular channel 54 formed between the front core member 50 and the rear core member 48. The coil 52 is encapsulated in a non-ferrous abrasion-resistant material such as Zenite, so that the front and rear core members 50 and 48 and the magnetorheologic fluid that is circulated in the working gaps 36 and 38 of the clutch 10 will not abrade the wires of the coil 52.

Magnetorheological fluids (MRF) comprising a suspension of solid particles in a selected liquid are known wherein the fluid's yield stress must be exceeded in order to initiate flow. When the fluid is exposed to a magnetic field, the flow threshold yield stress increases as the flux density in the field increases. Yield stress is also known to increase as the volume fraction of solid particles in the suspension is increased. Accordingly, a desired yield stress for a selected MRF operating in a clutch can be achieved by controlling the volume fraction of suspended particles. Magnetorheological fluids useful as in the present invention are described in detail by commonly assigned U.S. Pat. No. 5,667,715 entitled "Magnetorheological Fluids," issued Oct. 20, 1998, and which is specifically incorporated herein by reference. The MRF is disposed in the working gaps 36 and 38. Due to the viscous nature of the MRF, it will generally remain in the working gaps when the clutch is not rotating. For purposes of the present invention, the magnetorheological fluid carries a selected volume percent of solid particles that permits slippage between the input rotor 30 and the output member, comprised of the outer and inner magnetic cores 32 and 34, when the MRC 10 is partially engaged during acceleration and transmission shifting events. An increased torque transfer is effected between input and output members as the MRC 10 is engaged through energizing the encapsulated coil 52, and substantially complete coupling is provided when the MRC 10 is fully engaged with negligible slippage between the input and output members.

The front core member 50 has a bearing plate 56 secured thereto and rotatably supported by a bearing 58 that is disposed between a shaft extension 60 of the input member 12 and the bearing plate 56. The cover 40 and the bearing plate 56 cooperate to form a space or reservoir 57 in which any magnetorheological fluid that is not disposed in the working gaps 36 and 38 is contained. The cover 40 and the bearing plate 56 have respective annular troughs 62 and 64 which cooperate with respective annular troughs 66 and 68 formed on the labyrinth plate 22 to form labyrinth passages in the reservoir 57. While the magnetorheological fluid is viscous and resistant to flow, when the MRC 10 is at rest, some of the magnetorheological fluid may leave the working gaps 36, 38. This fluid will progress along the walls of either the cover 40, the bearing plate 56, or the labyrinth plate 22 and encounter the annular labyrinth passages formed by the troughs 62, 64, 66, and 68 and from there be directed to the lowest portion of the reservoir 57. This will maintain the magnetorheological fluid out of contact with the seal 44 and a seal 72 disposed between the bearing plate 56 and the shaft extension 60.

The outer core 32 and the rear core 48 are secured for common rotation by a channel ring 74, a spring damper 76 and a housing 78. The housing 78 is secured to the cover 40 to substantially enclose the input rotor 30 and the magnetic cores 32, 48 and 50. The spring damper 76 is drivingly connected through a spline 80 with the output shaft 16 and, as previously described, the rotor 30 is drivingly connected with the engine 14. The encapsulated coil 52 is connected by electrical conductors or wires 82 and 84 with a conventional slip ring assembly 86 which in turn is connected with the electrical system of a vehicle, not shown. The encapsulated coil 52, when energized, creates a magnetic field which causes the magnetorheological fluid to become more viscous as the field intensity increases, thereby establishing a magnetorheological drive relationship between the rotor 30 and the cores 32, 48 and 50. Thus, the magnetorheological clutch assembly 10, when energized, will transmit engine power to the output shaft 16.

The rear core 48 has a plurality of axially extending passages 88 that intersect the annular channel 54 and an inner surface 90 of the channel ring 74. The interface between the front core 50 and the rear core 48 has formed therein a plurality of radial passages 92 that intersect the annular channel 54 and the radially inner periphery 96 of the rear core 48. These passages 88 and 92 direct cooling fluid, as will be explained later, through the annular channel 54 to provide cooling of the encapsulated coil 52.

Figure 3:
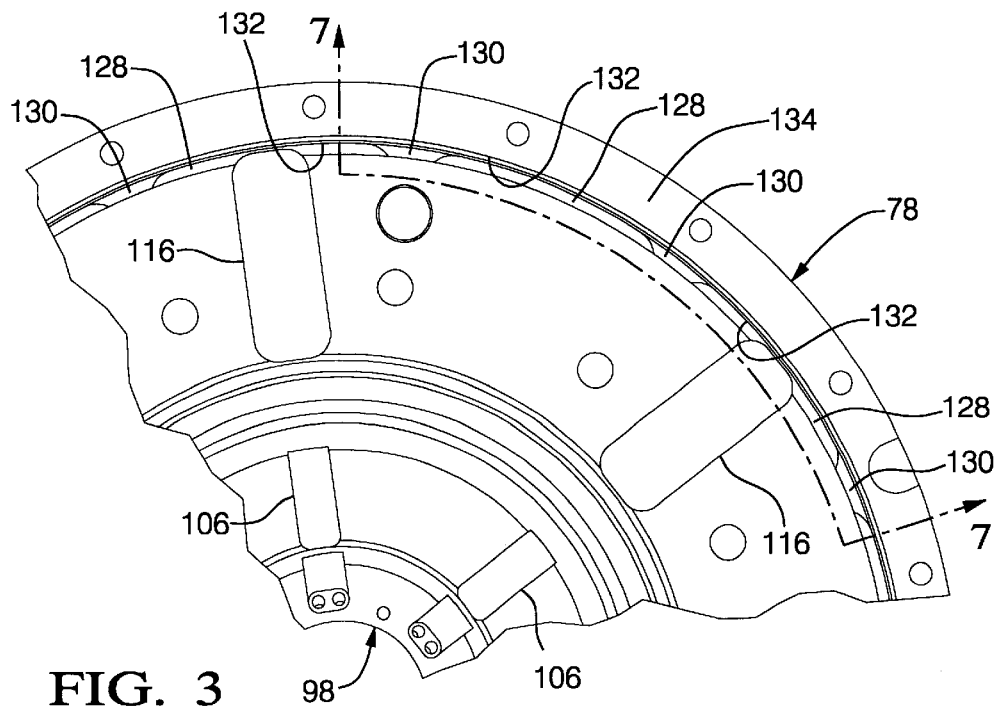
FIG. 3 is a view taken along line 3—3 in FIG. 1.
Figure 4:
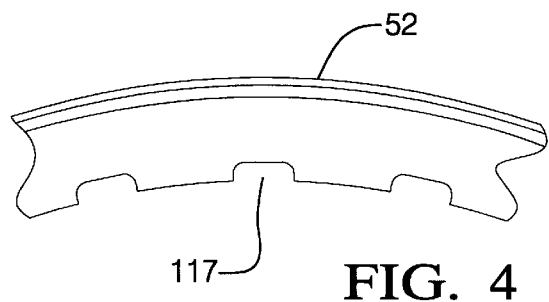
FIG. 4 is a view taken along line 4—4 in FIG. 1.

A clutch hub 98 has a sleeve portion 99 that is rotatably supported on a shaft 100 that is secured to the clutch housing 70. The slip ring 86 is mounted on the sleeve portion 99 and has an outer portion 102 that is connected with the housing 70. Electrical connections, not shown, are arranged between the housing 70 and the stationary portion 102 to permit the distribution of electrical energy to the encapsulated coil 52. The clutch hub 98 has a radially extending annular portion 104 that is secured to the housing 78. As best seen in FIG. 3, the annular portion 104 has a plurality of equiangularly-spaced channels 106 that extend radially from the sleeve portion 99 to a space 108 formed between the hub 98 and a flow divider plate 110. The sleeve portion 99 has a plurality of axially extending passages 112 that communicate from a space 114, between the shaft 100 and the sleeve portion 99, to the inner edge of the channels 106. The channels 106 communicate with a plurality of equiangularly-spaced, radially-extending channels 116 formed in the housing 78. One or more of the channels 116 communicate respectively with the passages 88 to provide cooling fluid to the encapsulated coil 52. The fluid in the passages 88 flows through the slots 117, formed at the inner surface of the encapsulated coil 52 (see FIG. 4), to the passage 92.

The space 114 is in fluid communication through passages 118, passages 120, annular space 122, and passages 124 with a source of hydraulic fluid such as a conventional pump 126 that is driven by a pump shaft 129, which is drivingly connected with the shaft extension 60. The pump 126 supplies fluid from a transmission sump or reservoir 127 for control function, lubrication and cooling to a transmission, not shown, as well as cooling fluid for the clutch assembly.

Figure 2:
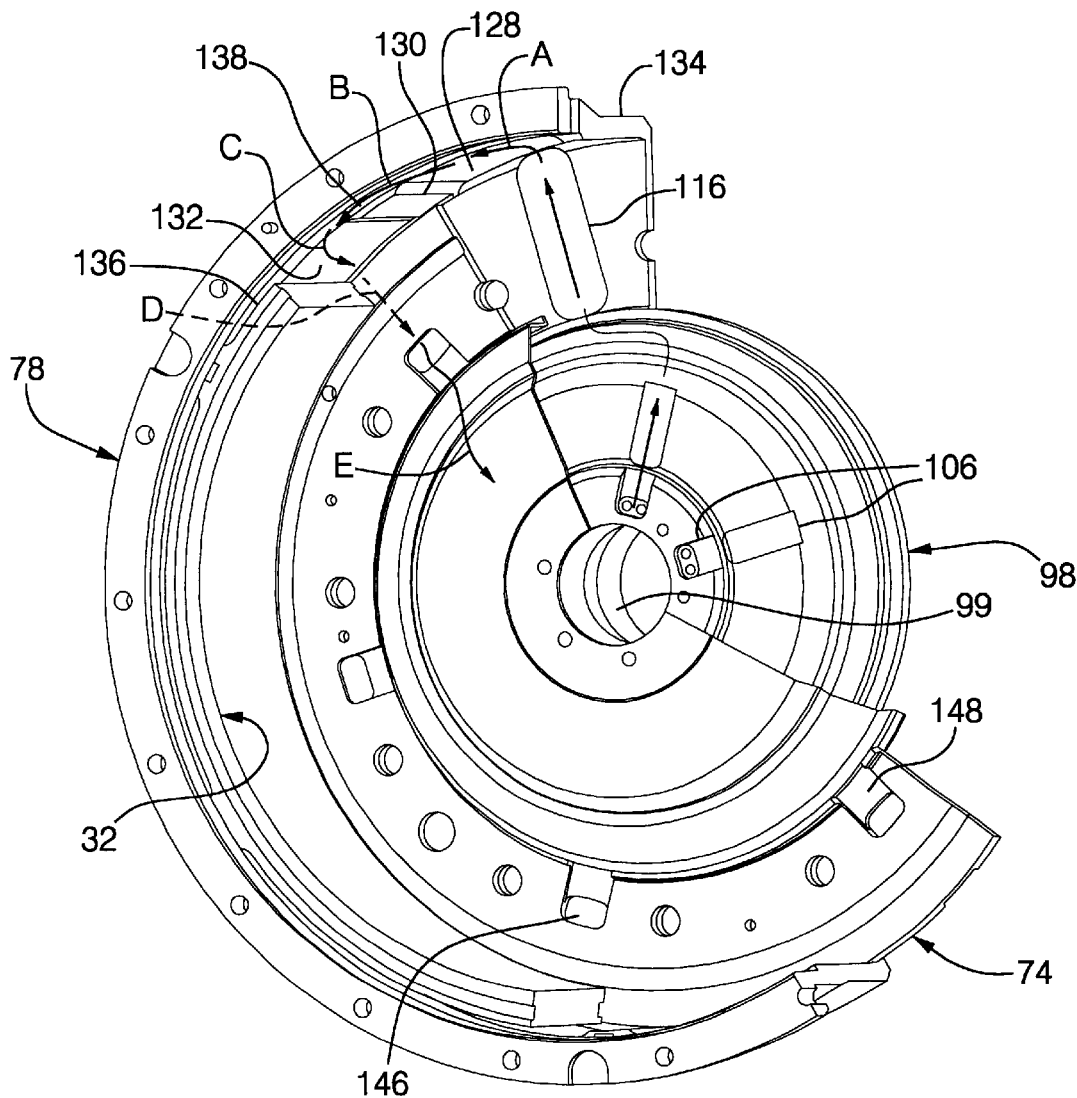
FIG. 2 is an isometric cut-away view of a portion of the magnetorheological clutch shown in FIG. 1.
Figure 7:
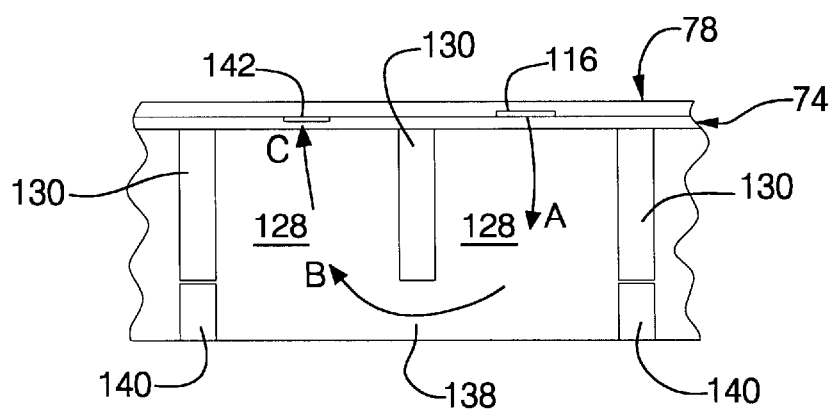
FIG. 7 is a plan view taken along line 7—7 in FIG. 3.

As best seen in FIGS. 2, 3, and 7, the channels 116 communicate with a circumferential space 128 formed between the housing 78 and the outer core 32. The circumferential space 128 is interrupted by weirs 130 that extend axially across a considerable portion of the inner surface 132 of an outer rim 134 of the housing 78 and closely fit with an outer surface 136 of the outer core 32 to provide a narrow circumferential channel 138 between the core 32 and the cover 78. Every other circumferential channel 138 is interrupted by a plurality of weirs 140 formed on the outer core 32. As best seen in FIGS. 2 and 7, the weirs 130 direct cooling fluid axially through the space 128 (Arrow A), circumferentially in the channel 138 (Arrow B), and axially through the space 128 (Arrow C).

Figure 5:
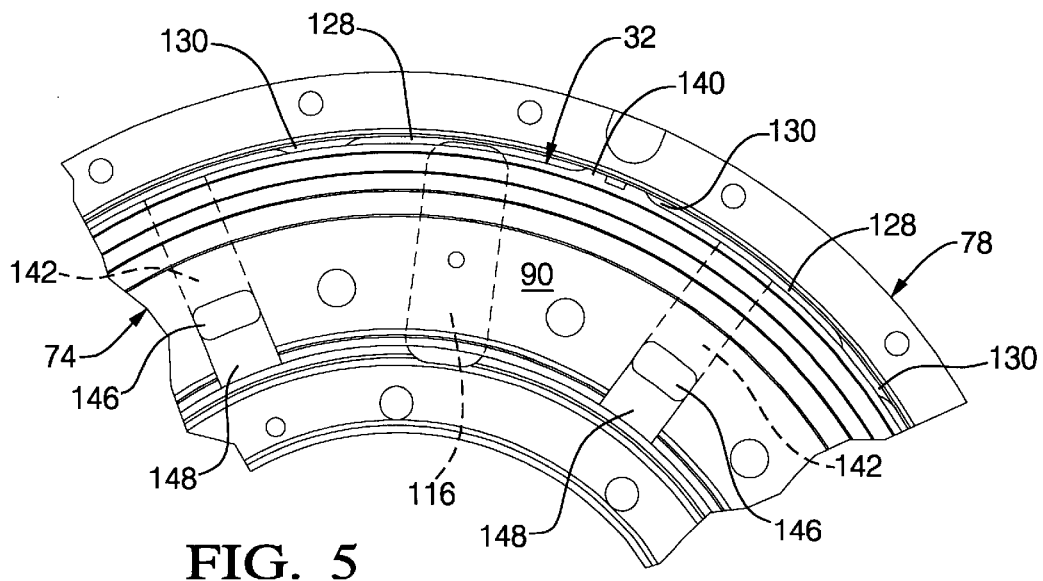
FIG. 5 is a view taken along line 5—5 in FIG. 1.
Figure 6:
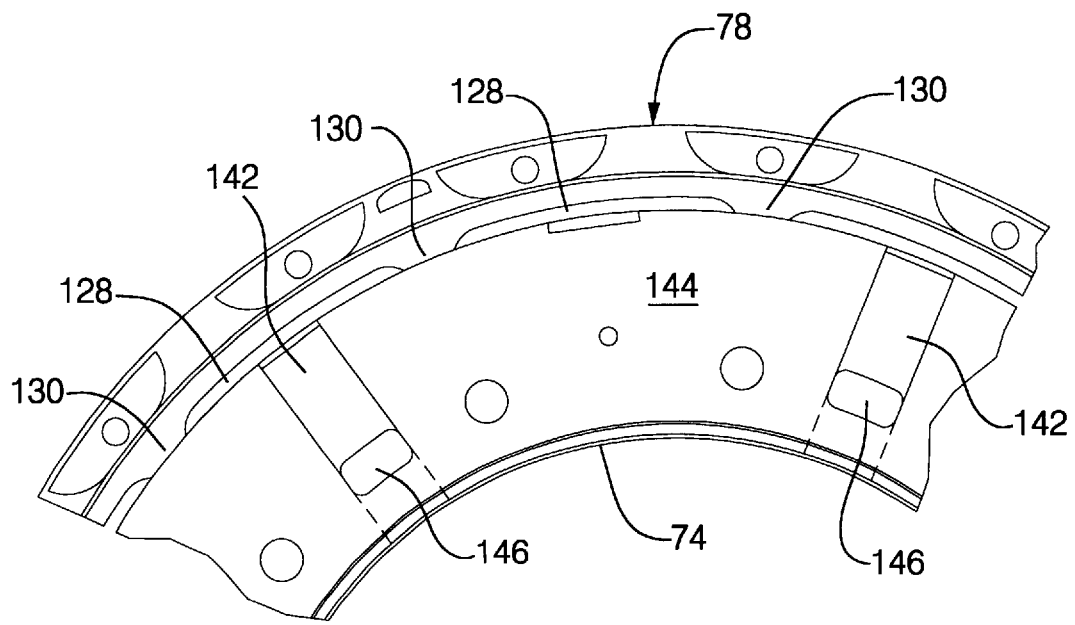
FIG. 6 is a view taken along line 6—6 in FIG. 1.

The channel ring 74 has a plurality of radially extending channels 142 formed in an outer surface 144 (see FIG. 6) that is disposed in abutment with the housing 78. The channels 142 communicate with ports 146 formed in the channel ring 74. The ports 146 each communicate with a respective radially extending channel 148 formed in the inner surface 90 (see FIG. 5). The channels 142 communicate with the space 128 equidistant between intermediate sequentially-spaced weirs 130 (see FIGS. 6 and 7). The fluid entering channel 142 flows inwardly (Arrow D) through the ports 146 into the channels 148 (Arrow E), see FIG. 2. The channels 148 communicate cooling fluid with a space 150 formed between the divider plate 110 and the spring damper 76. The cooling fluid flow from the space 150 surrounding the spring damper 76 flows axially in an annular space 151 along the pump shaft 129 to a coolant outlet port 152 which is in fluid communication with the hydraulic fluid reservoir 127. The cooling fluid that flows through the annular channel 54 and the passage 92 also returns to the reservoir via this path.

The electrical conductors 82 and 84 pass through respective passages 88 and respective fittings 154. The fittings 154 are secured in the housing 78 at diametrically opposed locations. Only one of the fittings is shown in FIG. 1. The fitting 154 has conventional sealing material surrounding the conductor 82 that prevents the fluid in passage 88 from escaping to atmosphere. The cover 78 also has a plurality of fill openings 156 that are aligned with the working gaps 36 and 38. These openings 156 permit the introduction of MRF into the working gaps at assembly. The openings 156 are closed and sealed with plugs 158 to prevent the leakage of the MRF.

During operation of the MRC 10, the encapsulated coil 52 is energized by a conventional electrical source, not shown, in accordance with a command signal from a conventional engine control module or transmission control module, not shown. The control modules are preferably components of a conventional electronic control unit, not shown, that includes a programmable digital computer. These controls are well known to those skilled in the art. The encapsulated coil 52 produces a magnetic field, proportional to the electric current delivered thereto, which encompasses the outer magnetic core 32 and the inner magnetic core 34. The magnetic field thus established causes the particles in the MRF in the working gaps 36 and 38 to become more aligned and increases the viscosity of the MRF such that the torque capacity of the MRC 10 is increased. The engine power is transmitted to the output shaft 16, sprocket 29 and the transmission. As the electrical current is increased, the torque capacity of the MRC 10 is increased to permit a smooth launch of the vehicle similar to a fluid coupling.

The MRC 10 can also be employed as a shifting clutch which is utilized to change ratios within the transmission in a well-known manner. The shifting clutch can be of the rotary type or the stationary type (brake). In both of these applications, the cooling flow paths will be similar. The cooling flow will enter the clutch at the inner periphery and be transported through the channels 106 and 116 to the rim 134 of the housing 78 and to the encapsulated coil 52. The cooling flow at the rim 134 of the housing 78 will follow the serpentine path describe by the Arrows A, B, and C in FIG. 7. The cooling flow is then directed inward through the channels 142 and 148 to the inner periphery of the inner magnetic core 34. The cooling flow passing the encapsulated coil 52 is commingled with the cooling flow from the channels 148 and returned to the transmission reservoir 127.

What is claimed is:

1. A magnetorheological clutch comprising:
    a first magnetic core;
    a second magnetic core;
    a rotor disposed for relative rotation between said first and second cores;
    an electrical coil secured in one of said first and second magnetic cores;
    a channel ring secured to said magnetic cores at an axial end thereof, said channel ring having a plurality of flow channels disposed adjacent at least one of said magnetic cores;
    a housing secured to said channel ring and said first and second magnetic cores, said housing having an outer rim portion disposed circumjacent an outer periphery of one of said magnetic cores, and a plurality of channels disposed adjacent said channel ring, said channels being angularly offset from said channels in said channel ring and communicating with an annular space between said outer rim portion and said outer periphery of said one magnetic core; a plurality of weirs formed on said outer rim portion and disposed intermediate adjacent ones of the channels on said channel ring;
    a plurality of weirs formed on said one magnetic core and being disposed in axial alignment with respective ones of said channels in said housing, said weirs on said housing and said one magnetic core cooperating to form a serpentine flow path in said annular space; and
    means for supplying a cooling liquid to said channels in said housing for distribution sequentially through said serpentine path and said channels in said channel ring.

2. The magnetorheological clutch defined in claim 1 further comprising:
    passage means formed in said housing, said channel ring and said other magnetic core for distributing a portion of said cooling liquid in at least some of said channels in said housing through an annular chamber in said other magnetic core surrounding said electric coil.

3. The magnetorheological clutch defined in claim 2 further comprising:
    said electric coil being encapsulated in an abrasive resistant compound and being effectively isolated from a magnetorheological fluid disposed between said magnetic cores and said rotor.

4. A magnetorheological clutch comprising:

a pair of spaced magnetic core members;

an input rotor disposed in a circumferential space between said magnetic core members;

an encapsulated electric coil secured in an annular chamber in a radially innermost one of said magnetic core members;

liquid cooling flow channel means for supplying cooling liquid to and returning cooling liquid from an outer periphery of a radially outermost one of said magnetic core members; and liquid passage means for directing a portion of said cooling liquid from said liquid cooling flow channel means to and from said annular chamber to establish cooling liquid flow through said annular chamber to cool said encapsulated electric coil.

5. The magnetorheological clutch defined in claim 4 further comprising:

said liquid cooling flow channel means comprising a channel ring axially adjacent to and secured with said magnetic core members, a housing axially adjacent said channel ring and including an outer rim portion disposed circumjacent the outer periphery of the radially outermost one of said magnetic core members and cooperating therewith to form a serpentine liquid flow path circulating liquid coolant between input channel means in said housing and output channel means in said channel ring.

6. The magnetorheological clutch defined in claim 5 further comprising:

said channel ring having an outer face adjacent said housing and an inner face adjacent at least one of said magnetic core members, said channel means in said channel ring including first channels in said outer face, second channels in said inner face, and through channel means for providing communication between said first and second channels, said first channels communicating with said serpentine liquid flow path; and a flow divider member disposed radially inward of said housing in a position to separate liquid cooling flow into channels in said housing from liquid cooing flow in said second channels.

7. A magnetorheological clutch comprising:

a first magnetic core;

a second magnetic core;

a rotor disposed for relative rotation between said first and second cores;

an electrical coil secured in one of said first and second magnetic cores;

a channel ring secured to said magnetic cores at an axial end thereof, said channel ring having a plurality of flow channels disposed at least partially adjacent at least one of said magnetic cores;

a housing secured to said channel ring and said first and second magnetic cores, said housing having an outer rim portion disposed circumjacent an outer periphery of one of said magnetic cores, and a plurality of channels disposed adjacent said channel ring, said channels being angularly offset from said channels in said channel ring and communicating with an annular space between said outer rim portion and said outer periphery of said one magnetic core; a plurality of weirs formed on said outer rim portion and disposed intermediate adjacent ones of the channels on said channel ring;

a plurality of weirs formed on said one magnetic core and being disposed in axial alignment with respective ones of said channels in said housing, said weirs on said housing and said one magnetic core cooperating to form a serpentine flow path in said annular space;

a flow divider plate means secured between said channel ring and said housing for preventing communication of liquid cooling flow between said flow channels in said channel ring and said channels in said housing; and means for supplying a cooling liquid to said channels in said housing for distribution sequentially through said serpentine path and to said flow channels in said channel ring.

8. The magnetorheological clutch defined in claim 7 further comprising:

passage means formed in said housing, said channel ring and said other magnetic core for distributing a portion of said cooling liquid in at least some of said channels in said housing through an annular chamber in said other magnetic core surrounding said electric coil; and said channel ring having an outer face adjacent said housing and an inner face adjacent at least one of said magnetic core members, said flow channels in said channel ring including first channels in said outer face, second channels in said inner face, and through channel means for providing communication between said first and second channels, said first channels communicating with said serpentine liquid flow path and said second channels discharging liquid coolant adjacent said flow divider plate means in commingling relation with liquid coolant discharged from said annular chamber.

* * * * *